United States Patent

Bürger et al.

Patent Number: 6,127,486
Date of Patent: Oct. 3, 2000

[54] CO-CONTINUOUS BLEND OF A FLUOROPOLYMER AND A THERMOPLASTIC AND METHOD

[75] Inventors: Wolfgang Bürger, München; Richard Witzko, Ottobrunn; Winfried Gleinser, Grafing, all of Germany

[73] Assignee: W. L. Gore & Associates, GmbH, Putzbrunn, Germany

[21] Appl. No.: 09/077,039

[22] PCT Filed: Sep. 19, 1997

[86] PCT No.: PCT/EP97/05159

§ 371 Date: Aug. 14, 1998

§ 102(e) Date: Aug. 14, 1998

[87] PCT Pub. No.: WO98/12255

PCT Pub. Date: Mar. 26, 1998

[30] Foreign Application Priority Data

Sep. 19, 1996 [DE] Germany .............................. 196 38 416

[51] Int. Cl.⁷ ...................................................... C08L 27/12
[52] U.S. Cl. .............................................................. 525/199
[58] Field of Search ............................................... 524/199

[56] References Cited

U.S. PATENT DOCUMENTS 3,941,860  3/1976  Couchoud et al. ..................... 525/199
4,749,752  6/1988  Youlu et al. ............................ 525/199

FOREIGN PATENT DOCUMENTS

| 0 256 748 | 2/1988 | European Pat. Off. . |
| 90/10673 | 9/1990 | European Pat. Off. . |
| WO 90/10673 | 9/1990 | European Pat. Off. . |
| 0 430 082 B1 | 11/1990 | European Pat. Off. . |
| 043082 | 11/1990 | European Pat. Off. . |
| 0 626 424 A1 | 8/1993 | European Pat. Off. . |
| 2045328 C1 | 10/1995 | Russian Federation . |
| 2 262 101 | 6/1993 | United Kingdom . |
| WO 94/14890 | 7/1994 | WIPO . |

OTHER PUBLICATIONS

Morphology and Mechanical Properties of Ultr–High Molecular Weight Polyethylene–Poly(tetrafluoroethylene) Blend Films.

"Technische Kunstsoffe auf Basis sich durchdringender Netzwerke (IPN) aus Polyamid und Silikon" . By R. Keuerleber; (1983).

*Primary Examiner*—Edward J. Cain
*Attorney, Agent, or Firm*—Allan M. Wheatcraft

[57] ABSTRACT

Microporous PTFE (ePTFE) is known to possess certain properties based on which it is excellently suited for specific purposes, for example, the material is air-permeable and water vapor-permeable, but not water-permeable so that it can be used for filter membranes, etc. In order to create additional functions and application possibilities for this material, a material is proposed that consists of a blend of a fluoropolymer and a thermoplastic. The two substances in the material are present as continuous structures, in which at least one of these structures, preferably both structures, are microporous. The two structures are intertwined with each other and form a so-called co-continuous macrostructure.

14 Claims, 2 Drawing Sheets x 200  $\overline{100 \mu m}$ x 3500  5 μm x 3500  5 μm

1

CO-CONTINUOUS BLEND OF A FLUOROPOLYMER AND A THERMOPLASTIC AND METHOD

FIELD OF INVENTION

The invention concerns an article comprising a blend of a fluoropolymer and a thermoplastic polymer

BACKGROUND OF THE INVENTION

PTFE (polytetrafluoroethylene) is an advantageous material for a variety of purposes. The material is used in a wide variety of areas especially in its microporous form, for example, as expanded PTFE (ePTFE), e.g., in clothing articles, packings, filter membranes, medical implants, etc.

It is known that PTFE can be provided with fillers to obtain specific properties of this material. Fillers include particles of carbon, metal, metal oxides, glass or plastics. In this case the particle fillers are added to the PTFE starting material in the form of powder.

EP- B1-0 184 392 discloses structures and membranes, in which the pores of the finished structures are filled with solutions of polymers or monomers, that are then polymerized. However, these variants are confined to certain membranes or films, since a solvent that must fully wet the membranes must be used and the concentration of dissolved polymer or monomer must be kept very low. At high concentration of fillers the pores are clogged and the porosity is limited. In addition, these methods are limited to very open-pore membranes, since small-pore systems exhibit extremely reduced material transport after this treatment.

Filter membranes are a special example of application of ePTFE. The membranes used for industrial filters are typically cleaned at specific intervals. Scraping contamination from the surface of a filter membrane is included in this cleaning. In this example it is obvious that the membrane must be as abrasion-resistant as possible so that it withstands repeated mechanical cleaning.

Another example of a desired property of ePTFE is stability relative to energy rich radiation, e.g. gamma or beta radiation. Since ePTFE becomes brittle when exposed to energy rich radiation one can consider stabilizing the overall structure of filled ePTFE relative to the effect of energy rich radiation by selecting an appropriate filler in an appropriate amount.

The filler in ePTFE is generally found in the intermediate spaces of the porous ePTFE formed by the nodes and fibrils. For example, when filter membranes made of filled ePTFE are subject to mechanical stress, for example, by scraping off filter residues, part of the filler is released from the ePTFE structure on each exposure of the surface to mechanical stress, which ultimately adversely affects the properties of the material.

SUMMARY OF THE INVENTION

In the present invention an article of a fluoropolymer, especially ePTFE is combined with a thermoplastic in order to impart properties of the thermoplastic to the ePTFE. This allows the ePTFE to be used in different applications as a result of properties imparted to the ePTFE, for example, improved abrasion resistance, as well as stability relative to the effect of energy rich radiation.

The term "article" shall refer to sheet-like or film-like material, films, membranes, tubes, fibers, hollow fibers, gaskets, etc. The thickness of film of the invention is typically between about 20 $\mu$m and a few hundred $\mu$m.

The following description of the invention refers especially to expanded polytetrafluoroethylene (ePTFE), although the invention embraces fluoropolymers in general as starting material for a fluoropolymer-thermoplastic mixture (blend).

The blend of ePTFE and a thermoplastic has a co-continuous intertwined structure. Each polymer is in the form of a continuous structure, wherein the structures of each polymer are intertwined with one another to form a co-continuous macrostructure. Each structure remains independent of the other even though intertwined.

The term "co-continuous" means that both the ePTFE component and the thermoplastic component each separately has a continuous phase structure so that the two components jointly form an intertwined macrostructure. For example, if one were to remove the ePTFE structure from the co-continuous structure the continuous thermoplastic phase would still exist in its original form. The same would also apply if the thermoplastic phase were removed.

The individual structures are made up of networks. These networks can be seen analogously to fishing nets. Each network is made of individual strands, which connect with each other at certain points. Alternatively, one could see the networks being made up of one extremely branched out strand, with branches connecting to other branches at certain points, and sub-branches branching out from the major branches, also connecting to each other at some points. Each network is intertwined with the other network in such a way, that it could be seen to be interwoven with it. Although there are contacts between the networks, there are no bonds between the networks or the branches of the differing networks. These two interwoven networks form the macrostructure.

The ePTFE strands have micropores. The thermoplastic strands may be microporous, depending on the conditions during the stretching procedure, described further below, that is employed to make the co-continuous structure of the invention. Each strand of each network may be very thin, i.e. in the range of a node or fibril, later described herein in more detail, or very thick, i.e. in the range of several, up to several or many nodes or fibrils

DETAILED DESCRIPTION OF THE INVENTION

Figure 1A:
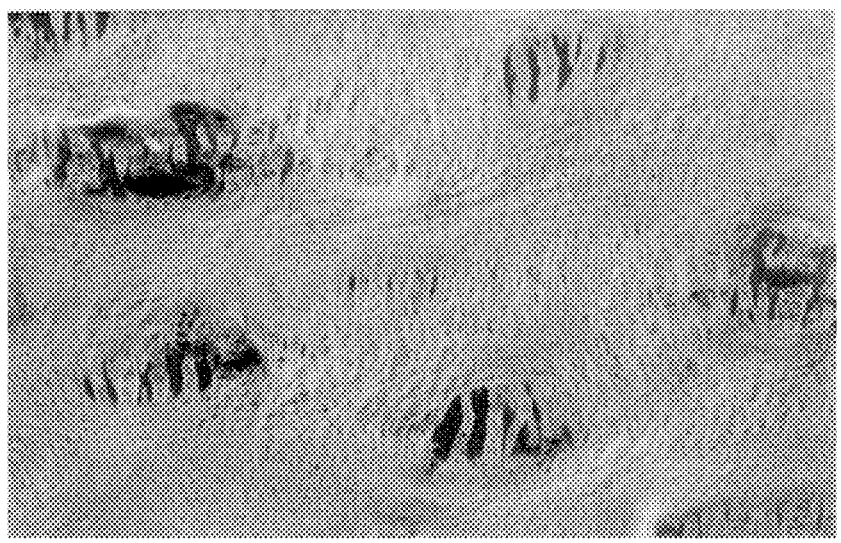
FIG. 1A shows a photomicrograph of a material according to the invention from a blend ePTFE and polyethylene (PE) at 200-fold magnification.

The co-continuous phase structure of the material according to the invention must not be confused with the so-called interpenetrating network (IPN) in which two networks interpenetrate at the molecular level (L. W. Barrett and L. H. Sperling: "Today's interpenetrating polymer networks" in Trends in Polymer Science, Vol. 1, No. 2, February 1993, pp. 45–49). It is explained in this document for two nonmiscible polymers that different phase morphologies can be formed. In typical mixtures of two thermoplastics one component forms a matrix and the second component (and optionally even a third and additional components) is dispersed in this matrix.

A special form is the form in which the two phases of two thermoplastics are interlocked and interpenetrate ("interpenetrating form"). According to the aforementioned article of L. W. Barrett and L. H. Sperling different types of bonds should then be active (physical crosslinks, ionic bonds, semicrystallinity). Rubber elasticity is mentioned as an important property of these known materials and the described examples concern in particular EPDM rubber in combination with, for example, polypropylene. This material could be viewed as a combination of the classic IPN and a pure mechanical mixture of materials.

On the other hand, in the material according to the invention two independent, preferably both microporous structures participate in the co-continuous phase structure in which there are contacts, but no bonds from one to the other structure.

The co-continuous structure according to the invention is prepared by mixing fluoropolymer with thermoplastic particles. The fluoropolymer particles are in contact with fluoropolymer particles and thermoplastic particles with thermoplastic particles and fluoropolymer particles with thermoplastic particles. The fluoropolmyer particles size may be in the range of 0.02–1 $\mu$m. The size of the thermoplastic particles may be in the range of 0.02–200 $\mu$m.

The type of interaction of particles is significant in formation of microporosity and the separate phases in the blend. In principle, the formation of the individual networks and the macrophase of the blend components is dependent on several factors. For example, the number of contact points of the thermoplastic particles with each other in unstretched film influences the formation and degree of development of the co-continuous structure. The more contact points are present, the more effective the co-continuous structure. The particle size of the thermoplastic component and the morphology of the particles also influence formation of contact sites. Irregular and small particles possess a greater surface and are therefore better suited to form contact sites. This effect can be intensified if the particles are joined by mechanical loading, for example, by a calendering or rolling step. In addition, the thermoplastic can be softened by increasing the temperature and then has a tendency toward adhesion or bond formation in the blend.

With consideration of the blend composition, a phase can be formed in which the microporous PTFE structure predominates. A phase whose properties and structure are dependent on the stretching and processing conditions of the thermoplastic forms with a predominant fraction of thermoplastic polymer.

Once the co-continuous structure is formed mechanical or thermal compaction and treatment of the material may be carried out. Configuration of the material according to the invention as a pore-free material is also possible by compaction of the porous material in the macrostructure.

However, a porous material in which both the PTFE and the thermoplastic form a microporous coherent structure, is preferred.

During stretching additional orientation of the blend components is achieved. The micropores and the co-continuous macrophase that form are again dependent on the stretching properties of the employed materials, the stretching ratio and the stretching rate, the temperature, blend composition and number of contact points. If stretching occurs above the melting point of the thermoplastic material, fibers or fiber bundles can form under some circumstances. These fibers adhere to each other and form the strands of a network.

The article according to the invention, especially in the form of a film-like material, enjoys significant advantages because of its special properties. The strength and abrasion resistance of ePTFE is increased by the structure of the thermoplastic woven with the structure of the ePTFE. In contrast to ordinary fillers that are generally readily released from the structure of ePTFE under mechanical stress on the surface of film-like materials, the separate phase of the thermoplastic in the material according to the invention is extremely resistant to such release since it is a coherent structure. In order for the thermoplastic to be released from the structure of ePTFE the structure of the thermoplastic must itself first be destroyed before the fragments can then be released from the material.

If the thermoplastic in the material according to the invention is resistant to energy rich-radiation, resistance to energy rich-radiation is achieved. Even with significant exposure and corresponding significant damage to the microporous PTFE structure the continuous structure of the thermoplastic ensures that the structural bond still holds together. The lifetime of such membranes and films is significantly increased in comparison with ePTFE films without a filler or with the usual particulate fillers.

Although the invention preferably uses PTFE as first component, fluoropolymers in principle are also useable as starting materials. Fluoropolymers are understood to include any type of coagulated dispersion of a fluoropolymer that causes the formation of a microporous fluoropolymer structure in the course of further processing. This structure can consist of nodes and fibrils, of only fibrils, of fibril strands or bundles of fibrils or even elongated nodes that are joined by fibrils.

The typical pore size of the micropores of the homogeneous ePTFE structure in the blend of the present invention lies between 0.05 $\mu$m and 10 $\mu$m. Blends of a high-molecular PTFE and a low-molecular PTFE can also be present.

As a result, the PTFE starting material can be a homopolymer, but also a blend of PTFE homopolymers. However, it is also possible to use a blend of a PTFE homopolymer with a PTFE copolymer. In this case the amount of comonomer is limited so that PTFE exhibits properties of "not being processable in the melt". This PTFE is referred to as modified PTFE in which the comonomers are contained in an amount below 2, preferably 1 wt % in PTFE. Examples of such comonomers are olefins, like ethylene and propylene; halogenated comonomers, like hexafluoropropene (HFP), vinylidene fluoride and chlorofluoroethylene; but also perfluoroalkyl vinyl ethers like perfluoropropylene vinyl ether (PPVE). HFP and PPVE are preferably used.

The homopolymer can also be used as a blend with low-molecular PTFE known in the form of micropowder. This is produced by irradiation of high-molecular PTFE or by special polymerization techniques.

An additional variant are blends of the PTFE homopolymer with fluoropolymers processable in the melt, for example, FEP (hexafluoropropylene/tetrafluoroethylene copolymer) or PFA (perfluoroalkylvinyl ether/tetrafluoroethylene copolymer). One preferably operates with at least 50 wt % of a high molecular PTFE homopolymer that can be processed by past extrusion and stretching and leads to ePTFE structures.

Orientable polymers that tend toward fiber formation, are stretchable into films and also experience orientation during zone melting are preferred as thermoplastic in conjunction with the material according to the invention.

These include:
polyolefins (polyethylene (PE), polypropylene (PP), polyisoprene, polybutene)
aliphatic and aromatic polyamides, aliphatic and aromatic polyesters, polysulfones, polyether sulfones, polyphenylene oxides, polyimides
liquid crystal polymers (LCP) with mesogenic structures in the main chain or in the side chain,
polyacrylonitrile, polycarbonate, polystyrene
polymethacrylates, polyacrylates, polyvinyl chloride, polyvinylidene chloride,
polyaryletherketone, e.g. poly (ether-ether )ketone, as well as copolymers of the mentioned material classes.

Furthermore, fluoropolymer copolymers that are processable in the melt can also be used as the thermoplastic component of the blend. This can be FEP (poly (hexafluoropropylene-co-tetrafluoroethylene)), PFA (poly (perfluoroalkylvinylether-co-tertrafluoroethylene)), PVDF (polyvinylidendiflouride), PVF (polyvinylfluoride), THV (poly(tetrafluoroethylen-co-hexafluoropropylene-co-vinylidenefluoride)), CTFE (polychlorotrifluoroethylene), ETFE (poly(ethylene-co-tetrafluoroethylene)) or poly (tetrafluoroethylene-co-perfluoro-2,2-dimethyl-1,3-dioxole).

Polyethylene with ultrahigh molecular weight (UHMW-PE), poly(ether-ether-ketone) (PEEK) and THV (poly (tetrafluoroethylene-co-hexafluoropropylene-co-vinylidenedifluoride)) are particularly preferred as thermoplastic in conjunction with the material according to the invention. In addition, polypropylene and polyamide are preferred. In principle, however, the invention is also applicable to other thermoplastics in conjunction with PTFE. The typical pore size of the homogeneous micropores of the thermoplastic structure lies between 0.1 µm and 10 µm.

Mixing of PTFE and UHMW-PE is already known in another connection and for other purposes. Thus, Y. Sugiura et al., Colloid Polym. Sci. 273 (1995), 633, describes blends of PTFE and UHMW-PE. Melt kneading of materials at 300° C. under nitrogen, however, leads to molecular weight degradation.

A porous PTFE material in which a thermoplastic polymer (FEP, PFA, PEEK) is contained is described in EP-A-0 613 921. However, this material does not form a co-continuous phase structure. In the microporous structure of nodes and fibrils the fibrils are mostly formed from PTFE, whereas the nodes are primarily formed from the thermoplastic polymer. As a result, one has a structure that corresponds in structure to that of PTFE, i.e., a single continuous phase structure.

Three micrographs prepared with a scanning electron microscope are shown in the enclosure to clarify the co-continuous phase structure according to the invention. FIG. 1A shows the structure of a material from ePTFE and UHWM-PE, which was produced according to a process described further below. The micrograph was produced with 200-fold magnification.

Figure 1B:
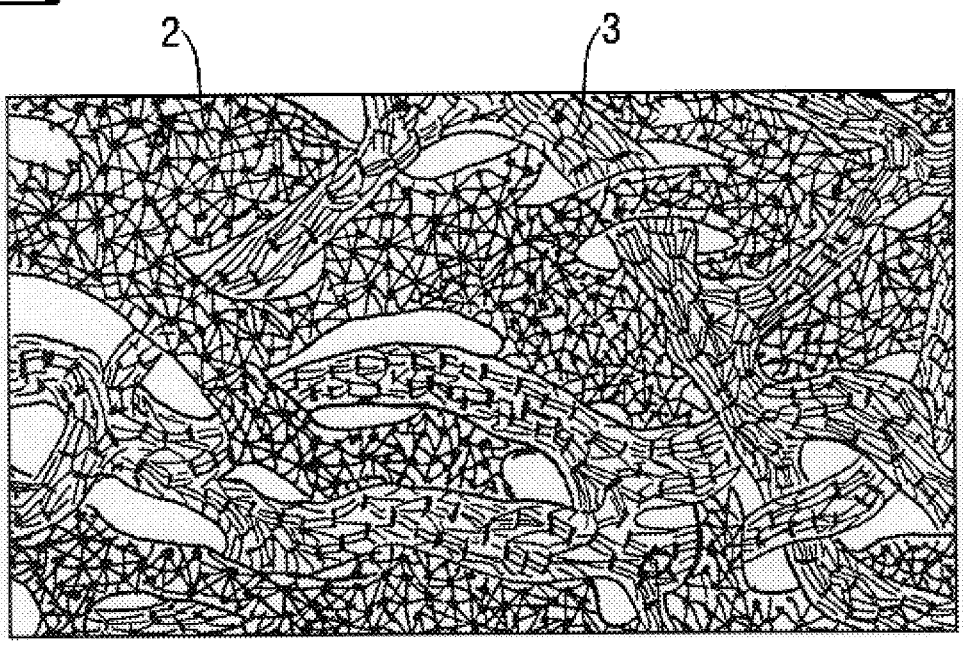
FIG. 1B shows a drawn, simplified representation of the photomicrograph according to FIG. 1A at roughly the same scale as FIG. 1A, containing polymer strands pulled apart, so that the intertwined nature is better understood (in actuality there are no open spaces)
Figure 2:
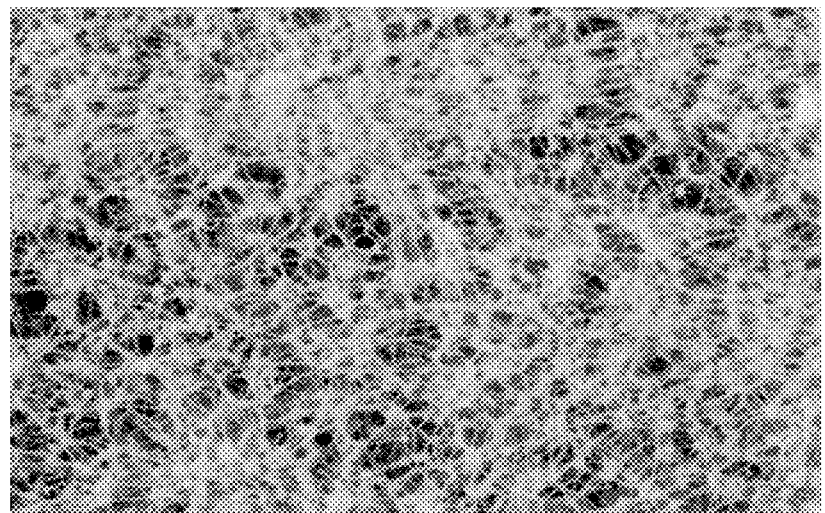
FIG. 2 shows a photomicrograph of the ePTFE phase of the blend shown in FIG. 1A, at 3500-fold magnification, showing the typical node and fibril structure of the ePTFE.
Figure 3:
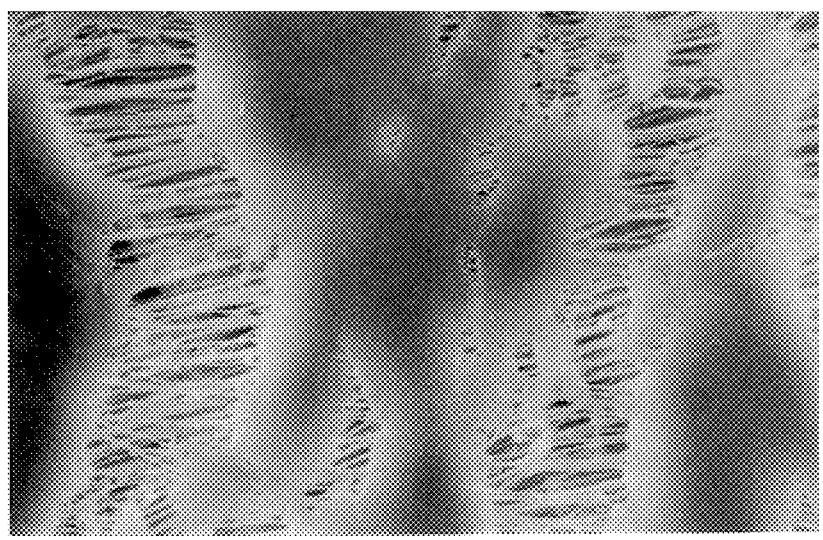
FIG. 3 shows a photomicrograph of the polyethylene (PE) phase of the blend shown in FIG. 1A, at 3500-fold magnification, also displaying a microporous structure.

FIGS. 2 and 3 show individual regions of the structure in FIG. 1A at 3500 times magnification. In order to clarify the two interwoven separate phases of the two components and the homogeneous microporous structure present in each phase the structure is drawn in FIG. 1B, in which the scale corresponds to roughly the 200 times magnification according to FIG. 1A.

As is apparent in FIG. 1A, two separate continuous phases are woven together into a co-continuous structure. As follows in particular from the drawing in FIG. 1B, both the ePTFE and the PE each forms a coherent, continuous separate structure and homogenous micropores of ePTFE and PE can be recognized in each structure.

The nodes and the fibrils running between the different nodes can be seen in FIG. 2, showing the typical structure of ePTFE. In FIG. 3 the homogeneous micropores showing the PE structure can be seen, which, however, in contrast to the ePTFE, have larger coherent regions between the fibrils. These are clearly distinguished at 3500× magnification from the correspondingly magnified PTFE structure, as shown in FIG. 2. It can be seen by comparing FIGS. 1A, 2 and 3, that each ePTFE strand has a thickness corresponding to a large number of nodes and fibrils, whereas each PE strand only has a thickness of 3 to 4 fibrils, in this particular material sample.

The invention also concerns a process for production of the material. In some process steps according to the invention it is important that certain parameters values are maintained so that the co-continuous macrostructure according to the invention is formed from PTFE and a thermoplastic. The present invention now devises a way to process and treat the two materials simultaneously so that the co-continuous phase structure is obtained.

The process according to the invention for production of material from a blend of a fluoropolymer and a thermoplastic, which form a co-continuous phase structure in the material, includes the following steps:

a) Aqueous fluoropolymer dispersions and dispersions of a thermoplastic are coagulated, for example, by addition of an electrolyte and/or by intensive agitation, in which the total amount of thermoplastic is 20 to 90 wt %, preferably 30 to 70 wt %;

b) The material obtained in step a) is dried, mixed with a lubricant and paste extruded c) The extrudate is calendered at a temperature below the decomposition temperature but above the glass transition temperature of the thermoplastic;

d) The lubricant is removed either before or after step c).
Removal of the lubricant occurs by extraction of the liquid. The liquid can also be driven off thermally.

e) The material of step d) is then stretched by passing it over heated rolls or a heated air stream at a temperature above the glass transition temperature of the thermoplastic. The transport direction of the material over the rolls or air stream is referred to as "machine direction". Stretching can occur in the machine direction (M) or perpendicular to it, i.e., transversely (T).

Limitation of the range for the amount of thermoplastics to 20 to 90% is important in the process according to the invention for the following reason: If the amount of thermoplastic is less than 20 wt %, the thermoplastic cannot form a continuous phase structure. If the amount of thermoplastic is more than 90%, the PTFE cannot form the usual continuous structure. This is particularly true for the microporous structure. Stretched PTFE (ePTFE) forms the typical structure from nodes and fibrils joining individual nodes. This structure can also be formed at a relatively limited amount of 10%, but below this limit of 10% (more than 90 wt % thermoplastic) no continuous PTFE structure is formed.

In addition to the weight fraction of PTFE, on the one hand, and that of the thermoplastic, on the other, the temperature during calendering is also important. The temperature must be adjusted so that the particles of the sheet material formed by paste extrusion are soft and deformable. When they come in contact they should stick together. This is achieved if the temperature is high enough that softening of the particles occurs, i.e. above the glass transition point of the thermoplastic.

During calendering the network of thermoplastic is already oriented in the machine or working direction.

After calendering the material is directly stretched either in the machine direction only, across the machine direction only or preferably in both directions. This produces a macrostructure, namely the known ePTFE with its nodes and fibrils, on the one hand, and the coherent fiber or microstructure of the thermoplastic, on the other. Stretching is carried out according to the disclosure in U.S. Pat. No. 3,953,566, which is incorporated by reference.

If UHWM-PE is used as thermoplastic, whose melting point lies between 120 and 150° C., calendering preferably occurs in a temperature range between 100 and 120° C. Subsequent stretching in the machine direction and across the machine direction preferably occurs in the melting point range, i.e., between 120 and 150° C. The stretching ratio is 1.1:1 to 1000:1, preferably 3:1 to 20:1. The stretching speed or stretching rate is 1%/sec to 10,000%/sec.

If the thermoplastic is PEEK, calendering similarly occurs above the glass transition temperature of the polymer and below the melting point, for example, between 200 and 344° C. (=melting point of PEEK). The PEEK particles at this temperature are soft enough to enter into a permanent bond with each other. Subsequent stretching occurs in a temperature range from 200 to 344° C. During stretching two microporous structures are simultaneously formed, namely a typical ePTFE structure, on the one hand, and a microporous PEEK structure, on the other. Stretching can also be conducted at higher temperatures, i.e., above the melting point of PEEK. PEEK fibers that adhere to each other and form a coherent network whose parts are interwoven with the typical ePTFE structure and therefore penetrate this structure, are formed from the PEEK melt. During the stretching process at this temperature the PTFE is also stretched in the molten state.

In addition to the typical thermoplastics UHWM-PE and PEEK mentioned above, other thermoplastics are also considered within the scope of the invention, as described above.

Test Procedures

Porosity:

Porosity is determined by the following equation:

porosity=(1-$\rho_m$/$\rho_t$)×100% where $\rho_m$ is the measured density and $\rho_t$ is the theoretical density of the sample.

Tensile strength:

Tensile testing was carried out on an Instron (Instron Corporation series IX-automatic material testing system 1.09) according to DIN standard 53888. The samples were 15 mm wide and the gauge length (distance between clamps) was 20 mm. The samples were pulled at a speed of 100 mm/min at 20° C. and 65% humidity. Tensile strength (maximum strength) $\sigma_m$ was recorded by the machine. Matrix tensile strength mTS is determined by the following equation:

mTS=$\sigma_m$×$\rho_t$/$\rho_m$

The data for the particle size of commercially available thermoplastics were taken from data sheets of the manufacturer.

Average Pore Diameter (Mean Flow Pore Size, MFP) and permeability:

A sample membrane having a 25 mm diameter was obtained and wetted with Porofil (perfluoropolyether), available from Coulter Electronics Ltd, UK. The wetted membrane was placed in a Coulter Porometer II (Coulter Electronics Ltd.) wherein the minimum, maximum and average pore diameter of the final product was determined.

Permeability was measured using a non wetted sample at air pressure of 0.1 N/mm$^2$.

Scanning Electron Microscopy (SEM)

A sample of membrane was sputtered with gold and measured in the Scanning Electron Microscope under vacuum. The Scanning Electron Microscope used was a Jeol, JSM4500 commercially available from Contron Electronik, Germany.

Radiation stability:

The experiments were performed with an electron-beam accelerator in the presence of air (oxygen). The samples were bombarded with electrons at 1.0 MeV and 4.2 mA.

Dose: 25, 50 and 100 kGy

Temperature: room temperature (RT)

EXAMPLE 1 (film)

A dispersion consisting of 3200 g UHMW-PE (ultrahigh molecular weight polyethylene) GUR 4022 (Hoechst Co., screened, d50=74 μm), 3.8 l isopropyl alcohol and 21.6 l deionized water was produced in a 40 l vessel. For this purpose about 21,200 g of PTFE dispersion (E. I. DuPont de Nemours & Co., Inc.) with a solids fraction of 22.6% was added during intense agitation. This mixture cocoagulated within 5 minutes. The water was filtered off and the filtered material dried in an hot air oven to a residual moisture content of at most 0.2 wt % water.

About 180 ml of an aliphatic hydrocarbon (boiling range 90 to 120° C.) was added to the powder mixture per 453 g. After mixing a cylindrical pellet was produced by vacuum pressing. A film (extrudate) was produced in a subsequent paste extrusion step that was about 16 cm wide and had a thickness of 1.1 mm.

This film was pressed through heated rolls to a thickness of 300 μm. The extruded and calendered film was then heat-treated so that the lubricant was eliminated. It was stretched in the machine direction at about 148° C. The stretching ratio was 3:1 to 20:1 (Tables 1 and 2). The film prestretched at 7:1 (Example 1.3) was then stretched transversely a second time in a zone heated with hot air in the machine direction at a machine speed of 5 m/min (Table 3).

TABLE 1

Properties of UHMW-PE - PTFE film stretched in the film direction.

| Example | Thickness, μm | Porosity, % | mTS (M), N/mm$^2$ | mTS (T), N/mm$^2$ | Stretching ratio |
|---|---|---|---|---|---|
| 1.1 | 280 | 62 | 17 | 3.2 | 3:1 |
| 1.2 | 265 | 64 | 20.1 | 2.8 | 5:1 |
| 1.3 | 230 | 60 | 22.5 | 2.2 | 7:1 |
| 1.4 | 140 | 61 | 44.4 | 1.6 | 20:1 |

In the table mTS (M) denotes the matrix tensile strength in the machine direction (M), mTS (T) denotes the matrix tensile strength in the transverse direction (T), i.e., across the machine direction.

TABLE 2

Properties of the UHMW-PE - PTFE films that were stretched in one direction

| Example | Permeability [l/min/cm$^2$] | Pore size min [μm] | Pore size max [μm] | Mean flow pore size MFP [μm] |
|---|---|---|---|---|
| 1.1 | 1.05 | 0.22 | 0.73 | 0.40 |
| 1.2 | 2.24 | 0.25 | 0.83 | 0.47 |
| 1.3 | 1.27 | 0.22 | 0.57 | 0.37 |
| 1.4 | 3.64 | 0.21 | 0.94 | 0.72 |

TABLE 3

Properties of the UHMW-PE - PTFE films that were stretched in two directions

| Example | Thickness μm | Porosity % | mTS (M) N/mm$^2$ | mTS (T) N/mm$^2$ | Stretch ratio | Permeability [l/min/cm$^2$] | Pore size min [μm] | Pore size max [μm] | Mean flow pore size MFP [μm] |
|---|---|---|---|---|---|---|---|---|---|
| 1.3T1 | 180 | 75 | 17.4 | 9.6 | 5:1 | 5.8 | 0.29 | 0.70 | 0.47 |
| 1.3T2 | 105 | 69 | 7.7 | 20.5 | 10:1 | 6.8 | 0.29 | 0.73 | 0.49 |

The structure that is illustrated in FIGS. 1A, 2 and 3 corresponds to Example 1.3 T1.

EXAMPLE 2 (film)

In similar fashion to the conditions mentioned in example 1 a dispersion consisting of PEEK (poly ether-ether ketone) Victrex XF 150 (Victrex Deutschland GmbH, ground, d50= 20 μm), isopropyl alcohol and deionized water was produced in a 40 l vessel. For this purpose enough PTFE dispersion (E. I. DuPont de Nemours & Co., Inc.) with a solids fraction of 22.6% was added during intense agitation so that after drying a blend with 30 wt % PEEK was obtained. After cocoagulation the water was filtered off and the material was dried (in a forced-air oven to a residual moisture content of at most 0.1 wt % water).

About 150 ml of an aliphatic hydrocarbon mixture (boiling range 170 to 210° C.) was added per 453 g to the cold screened powder mixture, the material was mixed and a cylindrical object produced by vacuum pressing. A film was produced in a subsequent paste extrusion step that was about 17 cm wide and had a thickness of 0.7 mm.

This film was pressed through heated rolls to a thickness of 300 μm. The extruded calendered film was then heat-treated so that the lubricant could be eliminated and stretched in the machine direction over heated rolls at about 356° C. The stretching ratio was 3:1 (Table 4).

The film prestretched at 3:1 was then stretched transversely a second time in a zone heated with hot air at 380° C. in the machine direction at a machine speed of 5 m/min (Table 5).

TABLE 4

Properties of the PEEK-PTFE films that had been stretched in one directions

| Example | Thickness μm | Porosity % | mTS (M) N/mm$^2$ | mTS (T) N/mm$^2$ | Stretch ratio | Permeability [l/min/cm$^2$] | Pore size min [μm] | Pore size max [μm] | Mean flow pore size MFP [μm] |
|---|---|---|---|---|---|---|---|---|---|
| 2.1 | 230 | 59 | 52 | 4.8 | 3:1 | 0.6 | 0.15 | 0.30 | 0.18 |

TABLE 5

Properties of the PEEK - PTFE films that had been stretched in two directions

| Example | Thickness μm | Porosity % | mTS (M) N/mm$^2$ | mTS (T) N/mm$^2$ | Stretch ratio | Permeability [l/min/cm$^2$] | Pore size min [μm] | Pore size max [μm] | Mean flow pore size MFP [μm] |
|---|---|---|---|---|---|---|---|---|---|
| 2.1T1 | 82 | 73 | 67.6 | 32.6 | 3:1 | 2.6 | 0.31 | 0.51 | 0.43 |
| 2.1T2 | 22 | 61 | 41.9 | 102.9 | 10:1 | 3.5 | 0.19 | 0.35 | 0.27 |

As described in conjunction with examples 1 and 2, other articles, for example, hollow fibers, fibers, seals and tubes, can also be produced.

EXAMPLE 3 (film)

The film of GUR 4022 and PTFE produced according to example 1 was calendered to 500 μm using heated rolls after extrusion. The extruded calendered film was then heat-treated so that the lubricant could be removed.

The film was then pressed for 5 minutes at 30 MPa and 170° C. A compacted film was obtained.

TABLE 6

Properties of a compacted film of UHMW-PE and PTFE.

| Example | Thickness, μm | Porosity, % | mTS (M), N/mm² | mTS (T), N/mm² | Comment |
|---|---|---|---|---|---|
| 3.1 | 500 | 44 | 4.4 | 3.5 | before pressing |
| 3.2 | 330 | 20 | 16.0 | 15.2 | after pressing |

EXAMPLE 4 (filament, fiber)

500 g mineral oil (paraffin oil, heavy, Fisher Chemical) was metered into 300 g of GUR 2022 (Hoechst Co., screened, d50=74 μm) and 700 g PTFE emulsion polymerizate (molecular weight >107, produced according to EP 0 170 382) over 5 minutes and mixed for another 10 minutes.

This mixture was pressed at about 20 bar to an article. Paste extrusion followed at 125° C. with a plunger speed of 0.05 mm/s. An extrusion pressure of 70 bar was set at a reduction ratio of 25:1.

The extrudate was passed through a hexane bath and freed of lubricant. The round cord was then stretched in a heated chamber at 131° C. and 6:1 at about 100%/s. A monofilament was obtained.

TABLE 7

Properties of a stretched filament (fiber) of UHMW-PE and PTFE.

| Example | Density, g/cm³ | Melting point of UHMW-PE, ° C. | mTS, N/mm² | Comment |
|---|---|---|---|---|
| 4.1 | 0.92 | 137.6 | 34 | Extrudate without lubricant |
| 4.2 | 0.78 | 143.0 | 374 | Stretched monofilament |

EXAMPLE 5

The film comprising calendered GUR 2022 and PTFE, that was produced in accordance with Example 3, was stretched at 140° C. and 59%/s at ratios given in the Table 8.

TABLE 8

Properties of a stretched films comprising UHMW-PE and PTFE

| Example | Thickness [μm] | Porosity [%] | mTS [N/mm²] | Stretch Ratio |
|---|---|---|---|---|
| 5.1 | 240 | 51 | 40.1 | 3:1/Machine direction |
| 5.2 | 200 | 60 | 60.1 | 6:1/Transverse direction |
| 5.3 | 160 | 56 | 84.8 | 10:1/Transverse direction |

EXAMPLE 6

The film comprising GUR 2022 and PTFE, that was produced in accordance with Example 1, was calendered to 130 μm after extruding and thermal treatment so that the lubricant could be removed through heated rollers (160° C.).

TABLE 9

Properties of heat calendered films comprising UHMW-PE and PTFE

| Example | Thickness [μm] | Porosity [%] | mTS [N/mm²] (M) | mTS [N/mm²] (T) | Observation |
|---|---|---|---|---|---|
| 6.1 | 500 | 44 | 4.4 | 3.5 | before calendering |
| 6.2 | 130 | 18.3 | 36.0 | 15.9 | after calendering |

EXAMPLE 7

The dried film comprising extruded and calendered PEEK (Poly-Ether-Ether-Ketone) XF 150 (Victrex Deutschland GmbH, ground, d50=20 μm) and PTFE, that was produced in accordance with Example 2, was finished to a final thickness of 300 μm. The PEEK content was 50% by weight. This tape was compressed to a thickness of 200 μm via a heated double belt press at 350° C. The film was then stretched in the transverse direction at approximately 395° C. in an air heated oven. (see Table 10).

TABLE 10

Properties of heat calandered and stretched films comprising PEEK and PTFE

| Example | Thickness [μm] | Porosity [%] | mTS [N/mm²] (M) | mTS [N/mm²] (T) | Stretch Ratio M/T |
|---|---|---|---|---|---|
| 8.1 | 200 | 10 | 19.8 | 11.1 | |
| 8.2 | 56 | 22 | 32 | 83 | 3:1 |
| 8.3 | 25 | 32 | 26 | 228 | 7:1 |

EXAMPLE 8

COMPARISON EXAMPLE (without thermoplastics)

3,460 ml paraffin oil with a boiling point of 191° C.–212° C. was metered in a solids-liquid mixer (Patterson Kelly) into a 12.0 kg of PTFE emulsion polymerizate (molecular weight >10 7, produced according to EP-A-0 170 382) over a period of 10 minutes and mixed for another 20 minutes. A pellet was then formed under vacuum at 14 to 15 bar from this mixture. By subsequent paste extrusion a film (tape) was obtained that was calendered between heated rolls to the desired thickness. The lubricant was removed thermally by passing the film over heated rolls (240° C.–250° C.). The film was then stretched 5:1 in the machine direction at 240° C. (200%/x) and sintered at 356° C. This film was then stretched two-fold perpendicularly to the machine direction at a temperature above the crystalline melt point. The draw ratio was 10:1.

EXAMPLE 9 (radiation stability)

TABLE 11

Properties of irradiated films comprising PTFE, UHMW-PE - PTFE and PEEK - PTFE

|  | mTS [N/mm$^2$] (M) | mTS [N/mm$^2$] (T) | 25 kGy mTS [N/mm$^2$] (M) | 25 kGy mTS [N/mm$^2$] (T) | 50 kGy mTS [N/mm$^2$] (M) | 50 kGy mTS [N/mm$^2$] (T) | 100 kGy mTS [N/mm$^2$] (M) | 100 kGy mTS [N/mm$^2$] (T) |
|---|---|---|---|---|---|---|---|---|
| 5.1 | 40 | — | 16 | — | 11 | — | 14 | — |
| 6.2 | 36 | 16 | — | — | 23 | 12 | 19 | 10 |
| 8.2 | 32 | 83 | 24 | 57 | 20 | 56 | 18 | 45 |
| 8.3 | 26 | 228 | 20 | 205 | 16 | 153 | 13 | 124 |
| Comparison Example 8 | 135 | 184 | 37 | 47 | 26 | 30 | 13 | 28 |

As shown in table 11 after radiation at 100 kGy

PTFE strength decreased to about 10% of initial strength

UHMW-PE-PTFE strength decreased to about 30–50% of initial strength

PEEK-PTFE strength decreased to about 50–60% of initial strength

What is claimed is:

1. Article comprising a blend of a fluoropolymer and a different polymer that is thermoplastic, each polymer having a continuous structure, said structures being intertwined with each other and at least one of said polymers being microporous; said fluoropolymer being selected from the class consisting of
   (i) a microporous stretched PTFE,
   (ii) a modified PTFE, or
   (iii) a blend of a microporous stretched PTFE and a fluoropolymer processible in the melt.

2. Article according to claim 1, in which each structure is in the form of a network and said networks are intertwined with each other.

3. Article according to claim 2, in which both polymers are microporous.

4. Article according to claim 1 in the form chosen from the group consisting of a film, a membrane, a tube, a hollow fiber, a fiber, or a gasket.

5. Article according to claim 1, in which the fluoropolymer comprises microporous stretched PTFE (ePTFE).

6. Article according to claim 1, in which the fluoropolymer comprises modified PTFE.

7. Article according to claim 1 in which the fluoropolymer comprises a blend of ePTFE and a fluoropolymer processable in the melt.

8. Article of claim 7 wherein the fluoropolymer processable in the melt is Teflon FEP or Teflon PFA.

9. Article according to claim 5, in which the thermoplastic is chosen from the group consisting of the following materials:

polyolefins,
   aliphatic and aromatic polyamides,
   aliphatic and aromatic polyesters,
   polysulfones, polyether sulfones, polyphenyl oxides, polyimides,
   LCP with mesogenic structures in the main chain or in the side chain,
   polycarbonates, polyacrylonitriles and polystyrenes,
   polymethacrylates, polyacrylates, polyvinyl chlorides and polyvinylidene chlorides,
   polyaryletherketones, as well as copolymers of these material classes;
   fluoropolymer copolymers that are processable in the melt.

10. Article according to claim 5, wherein the thermoplastic is poly(ether-ether-ketone) (PEEK).

11. Article according to claim 5, wherein the thermoplastic is UHMW-PE.

12. Article according to claim 5, wherein the thermoplastic is THV (poly(tetrafluoroethylen-co-hexafluoropropylene-co-vinylidenefluoride)).

13. Article according to claim 1 in which the weight fraction of thermoplastic is 20 to 90 wt %, preferably 30 to 70 wt %.

14. Article according to claim 1 wherein the article is resistant to energy rich radiation $\leq 100$ kGy.

* * * * *